United States Patent Office 3,497,512
Patented Feb. 24, 1970

3,497,512
ULTRAVIOLET RADIATION PROTECTIVE
PHTHALAZONE DERIVATIVES
Kurt Hofer, Munchenstein, Basel-Land, and Alfred Schilli, Reinach, Basel-Land, Switzerland, assignors to Sandoz Ltd., Basel, Switzerland, a corporation of Switzerland
No Drawing. Filed Oct. 10, 1966, Ser. No. 585,272
Claims priority, application Switzerland, Oct. 12, 1965, 14,045/65
Int. Cl. C07d 51/06; C08f 45/60
U.S. Cl. 260—250                    9 Claims

ABSTRACT OF THE DISCLOSURE

Certain novel derivatives of phthalazone, e.g. 12-tert.-butyl - 4 - hydroxy - 2,3 - diazafluoranthene, are disclosed which have a better stability against ultraviolet radiation and heat than prior o-hydroxybenzophenone derivatives, and which are useful in protecting various materials from the effect of ultraviolet radiation.

---

The present invention relates to new phthalazone derivatives and to their use in protecting various materials from the effect of ultraviolet radiation.

Substances are known which are capable of affording protection from ultraviolet rays. For this purpose these substances may be incorporated into the material to be protected or they may be incorporated into a filter layer, e.g. films, foils, sizing, oils, waxes, ointments or lotions, which filter layer is applied to a substrate to be protected; alternatively they may be incorporated into a substrate together with the material to be protected, e.g. a dyestuff. The most frequently used known substances of this kind are derivatives of o-hydroxybenzophenone. However, these last mentioned substances have only a limited stability under the prolonged influence of light and heat.

It has now been found that certain phthalazone derivatives described in detail hereinafter have a better stability against ultraviolet radiation and heat than said known o-hydroxybenzophenone derivatives. The new phthalazone derivatives may be used in the same manner as the known o-hydroxybenzophenone derivatives.

The present invention provides compounds corresponding to the formula

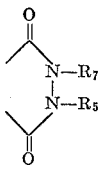

(I)

wherein A is one of the groupings of Formula I, II or III

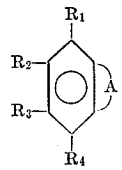

(II)

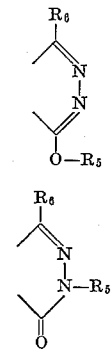

(III)

or

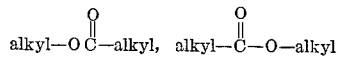

(IV)

each of the radicals $R_1$ to $R_4$ represents a halogen atom, CN, $R_5$, $COR_5$ or $COOR_5$, with the proviso that in every instance $R_1+R_2$, $R_2+R_3$, $R_3+R_4$ and $R_1+R_6$ may represent a carbocyclic or heterocyclic ring, especially one of the groupings (II), (III) or (IV), with the further proviso that the aromatic residue containing the radicals $R_1$ to $R_4$ may also contain one or more hetero atoms, especially nitrogen, each of $R_5$ and $R_7$ represents a hydrogen atom, an alkyl, halogenoalkyl, hydroxyalkyl, alkoxyalkyl, $$\text{alkyl—O}\overset{O}{\overset{\|}{C}}\text{—alkyl, alkyl—}\overset{O}{\overset{\|}{C}}\text{—O—alkyl}$$

carboxyalkyl, cycloalkyl, phenyl, halogenophenyl, alkoxyphenyl, alkylphenyl or alkylhalogenophenyl radical, and $R_6$ represents $R_5$, —O—$R_5$ or, together with $R_1$, a carbocyclic or heterocyclic ring, with the proviso that at least one of $R_1$ to $R_7$ must be other than hydrogen.

The present invention also provides a composition comprising (i) an organic material adversely affected by the influence of ultraviolet radiation or heat and (ii) an amount sufficient to protect said organic material from said adverse influence to the desired extent of a phthalazone derivative which is represented by the Formula I.

The compounds of Formula I are especially suitable for protecting dyed and undyed, natural or synthetic organic materials against the destructive effect of UV-radiation of a wavelength within the range of about 290–400 mμ. In many cases the compounds of Formula I are suitable for stabilizing these materials against some undesirable effects of both light and heat. Examples of organic materials which may be protected are: natural or synthetic macromolecular materials, for instance wool, silk, rubber, leather, natural or regenerated cellulose and fibre forming organic materials, e.g. cellulose derivatives, polyesters, polyamides, polyacrylonitrile, polyolefines, polyvinylchloride, polyvinylesters, polyvinylalcohol, polystyrene. These materials may be present in the form of plates, rods, coverings, foils, films, ribbons, fibres, granulates, powders and other shaped forms, or in the form of solutions, emulsions or dispersions. Furthermore, the compounds of Formula I are suitable for protecting unsaturated organic substances, especially oils and products resulting by working up oils. The compounds of Formula I can be added to starting materials which are later polymerized or polycondensed to give organic materials requiring to be protected from adverse influence of light.

The compounds of Formula I are derivatives of phthalazone of the formulae

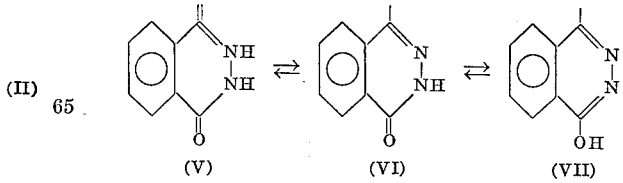

(V)        (VI)        (VII)

These may be produced by methods which are known in themselves, e.g. reacting an aryl-o-dicarboxylic acid or a derivative thereof with hydrazine or a derivative thereof, the choice of starting materials depending on the desired end product. Thus, for example, by reacting fluorenone-9-carboxylic acid-1 with hydrazine there results 4-hydroxy-2,3-diazafluoranthene or its tautomeric form 4-oxo-2,3-diaza-3,4-dihydrofluoranthene (Campbell and Stafford, J. Chem. Soc. 1952, 300). This reaction, and analogous ones, may be effected in an aqueous, aqueous-organic or organic medium at temperatures of 50° up to 150° C. Examples of suitable organic media are: liquid, aromatic and aliphatic hydrocarbons, aromatic chlorohydrocarbons, but preferably alcohols, ethers or ether-alcohols (e.g. methanol, ethanol, propanol, isopropanol, n-butanol, dioxan, di-isopropyl ether, ethyleneglycol, propyleneglycol, diethyleneglycol, methyl-, ethyl- or butylglycol, methyl-, ethyl- or butyl-diethyleneglycol). Preferably working is effected in water or in an alcohol (e.g. methanol, ethanol or isopropanol) or a water-alcohol mixture. Within the limitations imposed by the above definitions of $R_1$ to $R_7$, examples of other suitable starting materials for the reaction with hydrazine or its derivatives are phthalic acid, 1,2- or 2,3-naphthalene dicarboxylic acid, pyromellitic acid, trimellitic acid and the anhydrides or derivatives of these dicarboxylic acids, furthermore hemimellitic acid, mellitic acid, 3,3',4,4'-benzophenonetetracarboxylic acid dianhydride, pyridine-2,3-dicarboxylic acid, quinoline-2,3-dicarboxylic acid, 2-chloro-fluorenone-9-carboxylic acid-1, 7-n-butyl-fluorenone-9-carboxylic acid-1, 7-tert.-butyl-fluorenone-9-carboxylic acid-1, 2,7-di-tert.-butyl-fluorenone-9-carboxylic acid-1, 7-n-hexyl-fluorenone-9-carboxylic acid-1, 7-cyclohexylfluorenone-9-carboxylic acid-1, 7-benzyl-fluorenone-9-carboxylic acid - 1, 2',4'-dimethoxybenzoyl-2-benzoic acid, 4'-methyl-1,1'-benzophenone-2-carboxylic acid, 4'-phenyl-1,1'-benzophenone-2-carboxylic acid. In addition to hydrazine further examples of suitable derivatives for the formation of the phthalazone ring are: methylhydrazine, ethylhydrazine, butylhydrazine, hexylhydrazine, 1,2-dimethylhydrazine, phenylhydrazine, o-, m-, p-chlorophenylhydrazine, o-, m-, p-methoxyphenylhydrazine, 2,4-dimethoxyphenylhydrazine, p-tert.-butylphenylhydrazine, hydroxyethylhydrazine and hydrazylacetic acid

$(NH_2N^+H_2CH_2COO^-)$ or their esters. Especially interesting substances are the reaction products of pyromellitic acid or its anhydride with hydrazine and its derivatives.

The compounds of Formula I are colourless or slightly yellowish and have a strong UV-absorption in the wavelength band of about 290–400 mμ. They are thermally and chemically very stable and are especially resistant to destruction by the effect of light.

Suitable amounts of the compounds of Formula I to be added to the above mentioned organic materials to be protected are, for example, 0.005–5%, preferably 0.05–2%, by weight. They may be added to the materials to be protected either before or after shaping, for example in the form of foils or fibres. Depending on the point of time at which they are added, they are either evenly distributed through the mass or mainly in the surface of the structures formed therefrom. Working into the mass before shaping may be very easily effected when the compounds of Formula I are used in finely distributed form, if desired together with a softener or dissolved in a solvent therefor. The incorporation into shaped objects, for example foils or fibres, is suitable effected by immersion or spraying using the compounds of Formula I alone or solutions or dispersions thereof. The organic materials treated in this way are exceedingly stable against light which is evidenced, depending on the nature of the substrate, in a reduced tendency to become discoloured or crack formation and/or reduction of the mechanical properties. Coloured macromolecular structures incorporating a compound of Formula I in many cases show an improved colour stability to light over similar structures devoid of said compound. Transparent foils and plates of organic materials as defined above and containing a compound of Formula I may likewise serve as filters for UV-rays.

The materials into which the compounds of Formula I may be incorporated and the general methods of using them for protection from ultraviolet rays are known and detailed description relating thereto may be found, for example, in Swiss patent specification No. 389,239.

In the following examples the formulae or names of the compounds are given only as one of the possible tautomeric forms; parts and percentages are by weight and the temperatures stated in degrees centigrade.

EXAMPLE 1

0.1 part of 12-tert.-butyl-4-hydroxy-2,3-diazafluoranthene and 100 parts of polystyrene are mixed in a suitable mixer ["Gelimat"=Labor-Gelimat mixer obtained from the firm Drais GmbH, Mannheim Waldhof (West Germany)] and then pressed at 180° to give plates about 1 mm. thick in a press at a pressure of 30 tons. The clear plates very strongly absorb UV-light of 290–370 mμ and after 160 hours' exposure to light in a Xenotest lighting apparatus the UV-absorption is reduced by only about 5%. Similar results are obtained by using the same amount of 5,12-di-tert.-butyl-4-hydroxy-2,3-diazafluoranthene or 12-n-hexyl-4-hydroxy-2,3-diazafluoranthene.

The substance used in this example may be produced as follows:

28 parts of 7-tert.-butylfluorenone-9-carboxylic acid-1, 60 parts of methanol and 15 parts of hydrazine hydrate are boiled at reflux for 6 hours. Filtering is effected, the filter residue is washed with water, dried and crystallized from dioxan. 12-tert.-butyl-4-hydroxy-2,3-diazafluoranthene results in the form of slightly yellowish crystals of melting point 275–278°. When instead of 7-tert.-butyl-fluorenone-9-carboxylic acid the corresponding 2,7-di-tert.-butyl compound is used, or the 7-n-hexyl- or 7-n-octyl compound, the corresponding alkylated hydroxydiazafluoranthenes are obtained which have an effect similar to that of 12-tert.-butyl-4-hydroxy-2,3-diazafluoranthene.

EXAMPLE 2

0.5% of the compound of formula

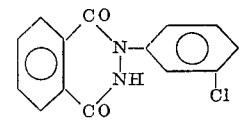 (X)

are added to a so-called plastisol consisting of 70% of polyvinylchloride and 30% of dioctylphthalate. After suitable shaping at a temperature of 180° an article of soft polyvinylchloride having a good light stability is obtained.

The compound of Formula X may be produced as follows:

15 parts of phthalic acid anhydride, 16 parts of m-chlorophenylhydrazine and 75 parts of water are boiled at reflux for 1 hour and after the addition of 50 parts of glacial acetic acid and 10 parts of 36% hydrochloric acid boiling at reflux is continued for a further 6 hours. The precipitate is filtered off, thoroughly washed with water and dried in a vacuum. The resulting 2-m-chlorophenylphthalazine forms white crystals of melting point 160–161°.

Correspondingly differently substituted compounds having a similar effect are obtained when, instead of m-chlorophenylhydrazine, there are used o- or p-chlorophenylhydrazine, 2,4-dichlorophenylhydrazine, o-methoxyphenylhydrazine, 2,4-dimethoxyphenylhydrazine, p-methyl- or p-tert.-butylphenylhydrazine is reacted with phthalic acid anhydride or mono- or dichlorophthalic acid anhydride.

EXAMPLE 3

Polyethylene to which there is added 0.25% of a mixture of the compounds of formula

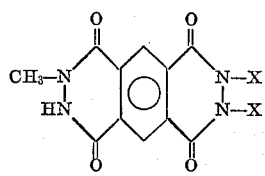

(XI)

wherein one X is hydrogen and the other X is methyl is rolled for 10 minutes at 150° and then pressed to form foils about 0.25 mm. thick. These have a very good stability to light and retain this even after heating for 100 hours at 100°.

A similar result is obtained when the following compounds are used as UV-light absorbers:

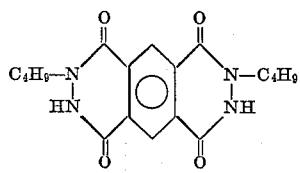

(XII)

or

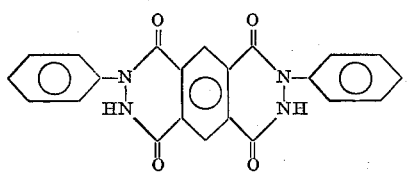

(XIII)

The production of the Compounds XI may be effected as follows:

22 parts of pyromellitic acid dianhydride together with 20 parts of methylhydrazine and 100 parts of water are boiled at reflux for 1 hour and boiling at reflux is continued for a further 6 hours after the addition of 50 parts of glacial acetic acid and 25 parts of concentrated hydrochloric acid. After filtering, washing and drying, 31 parts of a mixture of the compounds

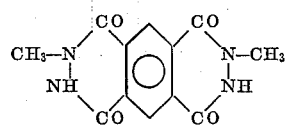

and

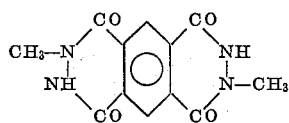

in the form of a white, fine crystalline powder are obtained. The mixture is insoluble in the usual organic solvents. It is soluble in dilute alkalis and may be filtered in this manner. Molecular weight by titration equals 271 (theory: 274). It is slightly soluble in dimethylformamide and dimethylsulphoxide. Instead of using methylhydrazine it is possible to react a corresponding amount of n-butyl-, n-hexyl-, n-octyl-, cyclohexyl-, benzyl-, phenyl- or hydroxy-ethylhydrazine with pyromellitic acid dianhydride, whereby products are obtained having an effect similar to that of the compounds of the above formulae.

EXAMPLE 4

Polypropylene with an addition of 1% of the compound of formula

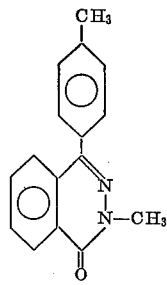

is mixed for one minute in the Gelimat and then pressed to foils of about 0.05 mm. thickness. The resulting transparent foils are stable to light.

The compound used is obtained by heating at reflux for 6 hours 60 parts of 4'-methyl-benzophenone-2-carboxylic acid with 30 parts of methylhydrazine, dissolved in 150 parts of methanol. Subsequently filtering is effected, washing with a little methanol and drying in a vacuum. White, fine crystals of melting point 149–150° result.

EXAMPLE 5

Polyethylene is mixed in a Gelimat at 150° for 1 minute with 0.6% of a compound of formula

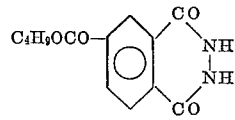

and then pressed to plates of 1 mm. thickness. The resulting plates are stable to light and also have a good stability to heat. The absorption maximum of the compound used is around 320–330 m$\mu$. It is obtained by reacting trimellitic acid anhydride with hydrazine and subsequently esterifying with n-butanol. In similar manner other esters, such as hexyl-, octyl-, decyl- etc. -esters, are obtained which may be used in similar manner as UV-absorbers.

EXAMPLE 6

The following compounds (in addition to 0.05–2%) are especially suitable as effective UV-light absorbers in fats, oils, waxes, lacquers:

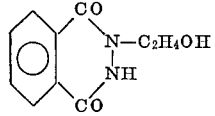

M.P.: 202–203°; $\lambda_{max.}$=310–315 m$\mu$.

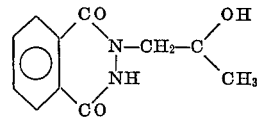

M.P.: 88–92°; $\lambda_{max.}$=310–316 m$\mu$.

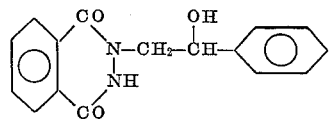

M.P.: 110–117°; $\lambda_{max.}$=308–315 m$\mu$.

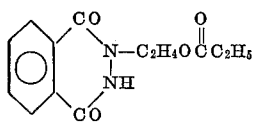

M.P.: 118–120°; λ_max.=308–315 mμ.

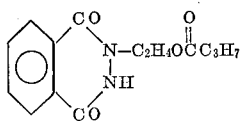

M.P.: 71–74°; λ_max.=307–315 mμ.

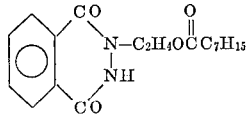

M.P.: 48–52°; λ_max.=307–315 mμ.

The same series of compounds but with chloro substituents in the 5,6- or 6,7-position, i.e.

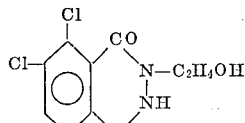

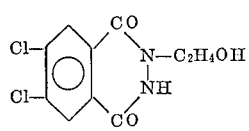

etc., absorbs in the region of 325–335 mμ.

Fats, oils, waxes and lacquers are protected from light damage by the addition of these substances, but they also act as UV-filters and are capable of protecting from UV-rays the most varied substrates (e.g. wood, paper, straw, plastics) and can likewise be used in cosmetics.

The compounds are obtained by boiling the corresponding hydroxyalkylhydrazines with phthalic acid anhydride, 3,4- or 4,5-dichlorophthalic acid anhydride in aqueous solution. The resulting hydroxyalkylhydrazones may be, if desired, esterified with carboxylic acids, carboxylic acid anhydrides or carboxylic acid halides.

These and other compounds of Formula I may be added, for example, to a known nitrocellulose lacquer in amounts of from 1 to 2% by weight. Wood treated with such a lacquer containing a compound of Formula I does not become dark on prolonged exposure to light.

Skin and face ointments and sun tan oils and lotions containing 1 to 5% by weight of these and other compounds of Formula I protect human skin from the deleterious effect of UV radiation of wave length 290–320 mμ.

We claim:
1. A compound of the formula

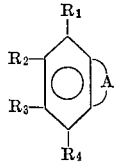

wherein A is a grouping of Formula II, III or IV:

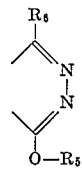

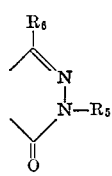

or

(IV)

each of $R_1$, $R_2$, $R_3$ and $R_4$ is Cl, CN, $C_{4-10}$-alkyl-OOC- or $R_5$, and wherein $R_2+R_3$ can be part of a ring which is identical with A, and wherein $R_1 \quad R_6$ can represent an indene nucleus in which one hydrogen atom of the benzene ring is replaced by $C_{4-8}$-alkyl, $R_5$ is H, $C_{1-8}$-alkyl, phenyl, benzyl, hydroxyethyl, hydroxypropyl, phenyl-hydroxyethyl or $C_{2-7}$-alkoxycarboxyethyl, $R_6$ is $R_5$ or methylphenyl, being methylphenyl only when it does not form a ring with $R_1$, at least one of $R_1$ to $R_6$ being other than H.

2. A compound according to claim 1 represented by the formula

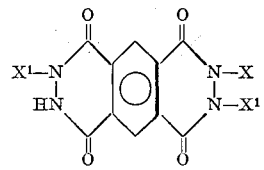

wherein X is H and $X^1$ is methyl, n-butyl, n-hexyl, n-octyl cyclohexyl, benzyl, phenyl or hydroxyethyl.

3. A compound according to claim 1 represented by 12-tert.-butyl-4-hydroxy-2,3-diazafluoranthene.

4. A compound according to claim 1 represented by the formula

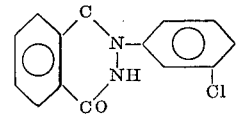

5. A compound according to claim 1 represented by the formula

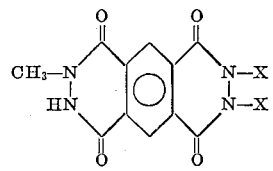

wherein one X is hydrogen and the other X is methyl.

6. A compound according to claim 1 represented by the formula

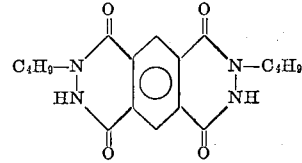

7. A compound according to claim 1 represented by the formula

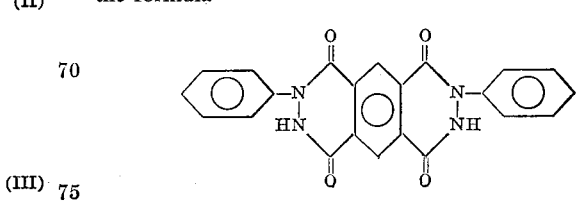

8. A compound according to claim 1 represented by the formula
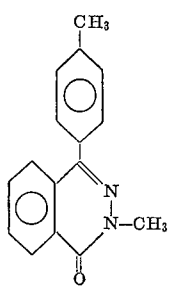
9. A compound according to claim 1 represented by the formula
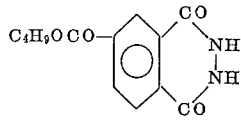
References Cited
UNITED STATES PATENTS
2,874,156    2/1959    Ruschig et al. -------- 260—250
NICHOLAS S. RIZZO, Primary Examiner
U.S. Cl. X.R.
106—176; 117—33.3; 252—300; 260—45.8; 424—59